March 21, 1967 R. G. SCHMIDT ET AL 3,310,723
HIGH VOLTAGE POWER SUPPLY FOR PHOTOGRAPHIC FLASH APPARATUS
Filed Oct. 18, 1963
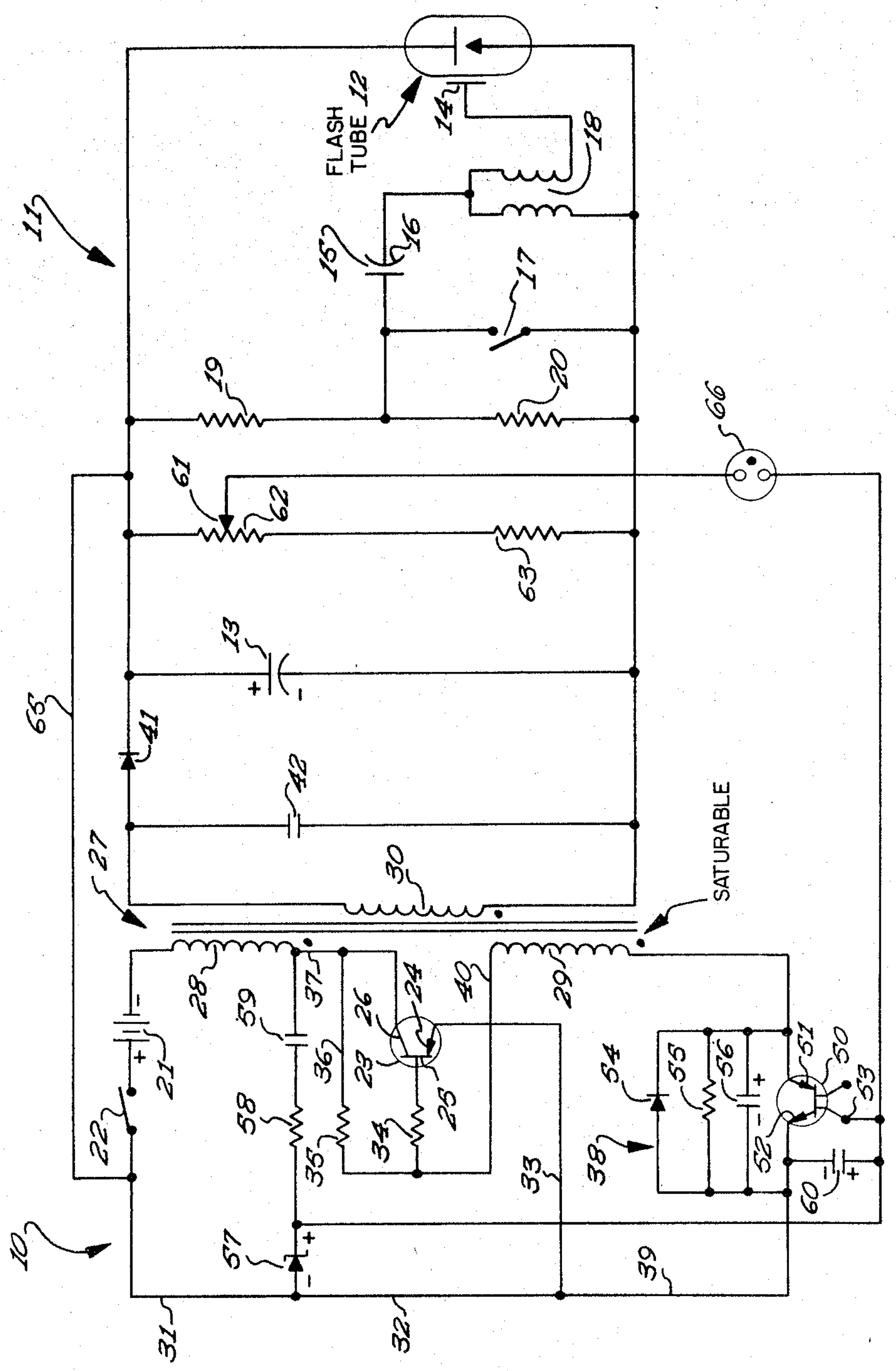

3,310,723
HIGH VOLTAGE POWER SUPPLY FOR PHOTOGRAPHIC FLASH APPARATUS

Ronald G. Schmidt, Denver, Colo., and Samuel Nissim, Malibu, Calif., assignors to Honeywell Inc., a corporation of Delaware Filed Oct. 18, 1963, Ser. No. 317,177
9 Claims. (Cl. 320—1)

The present invention is concerned with improved electric apparatus and particularly with such an apparatus which constitutes an electric power supply adapted to convert the low magnitude D.C. voltage of a battery to a high magnitude D.C. voltage. The structure of our invention is particularly useful as a power supply for an electronic photographic flash unit of the type having a high voltage capacitor which is adapted to be selectively discharged through a gas filled photographic flash tube to produce a short and brilliant flash of light in synchronism with the operation of the shutter of an associated camera.

Photographic flash units of this type have become known in the industry as electronic flash units. As the state of the art has developed, these units have become small in size and light in weight. Moreover, battery conserving circuits, called monitor circuits, have been developed to sense the state of charge of the main flash capacitor and to render the converter of the flash unit inoperative when the flash capacitor has been charged to a given value. The means to render the converter inoperative is responsive to a subsequent decay in voltage at the flash capacitor to again render the converter operative, such that the converter cycles, maintaining the main flash capacitor continuously charged, awaiting a discharge of the flash capacitor through the photographic flash tube as a photograph is taken by an associated camera.

Specifically, our invention is directed to an improved electric apparatus which provides more reliable and more efficient conversion of a low voltage D.C. to a high voltage D.C. to charge a capacitive load, such as the flash capacitor of an electronic photographic flash unit. Difficulty has been experienced with prior art devices in obtaining accurate and predictable turn-off and turn-on of the converter, and in achieving accurate and predictable operation of the converter while at the same time providing high electrical efficiency.

In the preferred embodiment of our invention, we utilize a transistor oscillator having a single transistor which is interconnected with a saturable transformer to provide a mode of class A oscillation and a mode of relaxation oscillation. The structure of the circuit is such that while the oscillator is operating as a class A oscillator, the small amount of electrical energy supplied to the high voltage capacitor is a little less than the leakage current of the capacitor, such that the capacitor does not receive an appreciable charge. Relaxation oscillation of the oscillating transistor, however, produces fast and efficient charging of the capacitor.

The monitor portion of our improved electric apparatus includes, in the preferred embodiment, a control transistor in the form of a silicon controlled switch which is a voltage responsive variable impedance in the feedback circuit of the oscillator such that when its impedance is high, the feedback is low and class A operation results. We furthermore provide a unique structure whereby the energy of the class A oscillation is converted to an operating voltage for the silicon controlled switch to place this switch in a conductive or low impedance state to thus lower the impedance in the feedback circuit and to cause the oscillator to then operate as a relaxation oscillator. In this manner, we have found that more accurate turn-on of the oscillator, that is, a transition from an operation wherein the capacitor is not being charged to the operation wherein the capacitor is being charged, is achieved by the structure which switches the silicon controlled switch to a conducting state.

In order to provide turnoff, and to thus discontinue charging of the capacitor, we provide voltage responsive means in the form of a normally non-conducting neon bulb which is connected to sense the voltage on the flash capacitor and to apply a turnoff voltage to the silicon control switch when there is no longer a need for charging of the capacitor.

Subsequently, as the charge on the capacitor either leaks off, or as the capacitor is discharged through the photographic flash tube, the neon bulb becomes extinguished and once again the resulting class A operation of the oscillator is effective to derive operating voltage for the silicon controlled switch to switch this device to a low impedance condition to reinstitute the relaxation mode of operation for recharging of the capacitor.

Thus, our invention provides accurate control of the turn-off and turn-on of an electric apparatus of this general type and, by virtue of the use of a relaxation oscillator, high electrical efficiency is achieved.

Our invention will be apparent to those skilled in the art upon reference to the following specification, claims, and drawing, of which the single figure is a showing of a preferred embodiment of our invention.

Referring to the single figure, reference numeral 10 designates generally our improved electric apparatus interconnected to portions of an electronic photographic flash unit identified generally by means of reference numeral 11. Reference numeral 12 designates a photographic flash tube which has its main current conducting electrodes connected to a high voltage capacitor 13 and has its triggering electrode 14 connected to a trigger circuit 15 including a trigger capacitor 16, a switch 17, and a trigger transformer 18. Trigger capacitor 16 is connected to be energized from capacitor 13 by means of a voltage divider including resistors 19 and 20. Switch 17 may in fact be the shutter contacts of an associated camera, this switch being adapted to be closed in synchronism with the opening of the shutter of the camera. When switch 17 is closed, capacitor 16 is discharged through the primary winding of trigger transformer 18 and a high voltage is provided at triggering electrode 14 to ionize the gas filled flash tube and to cause the charged capacitor 13 to discharge through the flash tube, producing a brilliant flash of light in synchronism with operation of the associated camera shutter.

Energizing voltage for charging capacitor 13 is derived from a low voltage D.C. source, shown as a low voltage battery 21. This battery is connected to a transistor oscillator under the control of an on-off switch 22.

The apparatus 10 includes an oscillating transistor 23 having emitter electrode 24, a base electrode 25 and a collector electrode 26. The electrodes 24 and 25 constitute the input electrodes of this transistor whereas the electrodes 24 and 26 constitute the output electrodes. Transistor 23 is connected in circuit with transformer means in the form of a saturable transformer 27 having a primary winding 28, a first secondary winding 29 and a second secondary winding 30. As shown in the drawing, windings 28, 29 and 30 are poled such that the lower terminals of these windings are of like polarity.

Oscillating transistor 23 is normally biased to a class A operating point on the characteristic curve of this transistor. This biasing point is established by a circuit which can be traced from the positive terminal of battery 21 through the switch 22, conductors 31, 32 and 33, the emitter-to-base circuit of transistor 23, resistors 34 and 35, conductors 36 and 37, and primary winding 28 to the negative terminal of the battery. A feedback circuit including the input electrodes of oscillating transistor 23 can be traced from the bottom terminal of secondary winding 29 through a variable impedance network identified by reference numeral 38, conductors 39 and 33, the emitter-to-base circuit of transistor 23, resistor 34, and conductor 40 to the upper terminal of secondary winding 29. Thus, the series-connected emitter-base circuit of the transistor 23 and the resistor 34 are shunted by the series-connected winding 29 and feedback circuit just described.

As will readily be apparent, the impedance represented by network 38 in the above traced feedback circuit determines the magnitude of feedback and in turn governs the magnitude of oscillation of the electronic means including transistor 23. So long as network 38 has a high impedance, oscillating transistor 23 is provided with a low magnitude feedback and class A operation results. When the impedance of network 38 is low, a higher feedback is provided and, as a result, transistor 23 conducts more heavily to drive transformer 27 into saturation, this constituting a relaxation oscillation mode of operation. Secondary winding 30 is interconnected with a rectifier 41 which is so poled to charge capacitor 13 as a flyback oscillator, charging capacitor 13 as the flux is collapsing from the saturated condition.

A further capacitor 42, of low capacitance value, is provided to reflect a capacitive impedance into primary winding 28 of transformer 27 to form a form of tuned circuit establishing and facilitating class A oscillation of the network. The capacitor 42 also acts as a filter for the sharp spikes associated with the switching waveforms, thereby increasing the efficiency of operation when the apparatus is oscillating in the relaxation mode.

Referring now to network 38, this network includes a silicon controlled switch 50 having an anode electrode 51 and a cathode electrode 52, a cathode gate 53, and a further gate which is not utilized in the particular embodiment disclosed. Network 38 includes parallel connected rectifier 54, resistor 55 and capacitor 56 connected to the electrodes 51 and 52.

As has been mentioned, with silicon control switch 50 at a high impedance state, oscillating transistor 23 functions as a class A oscillator. The elements 54–56 are then effective to cause capacitor 56 to charge to the polarity of voltage indicated on the drawing. This voltage constitutes a forward drive voltage for electrodes 51 and 52 of the silicon controlled switch 50.

In order to switch the silicon controlled switch 50 to a conducting state, we provide a circuit including a zener diode 57 which is connected in series with a resistor 58 and a capacitor 59. During class A operation of the oscillator, this circuit is effective to establish a voltage across zener diode 57 of the polarity indicated. The zener diode voltage is effective to charge a capacitor 60 connected to gate 53 of the silicon control switch. The voltage on capacitor 60, of the polarity indicated, is effective to render silicon controlled switch 50 conductive and thus lower the impedance in the above described feedback circuit.

The oscillator is then switched to a relaxation and flyback state of operation. As such, saturable transformer 27 is driven to saturation and on the flyback portion of the cycle, that is, when the flux is decaying within the iron of the transformer, the poling of rectifier 41 is such as to charge capacitor 13 to the polarity indicated. Also, during the flyback portion of the relaxation oscillator mode of operation, zener diode 57 is effective to protect silicon controlled switch 50, limiting the voltage which is developed at capacitor 60.

The apparatus of our invention continues to operate as a relaxation oscillator, building up the voltage present on capacitor 13 at a rapid and at an efficient rate. In order to sense the voltage present at capacitor 13, we provide a voltage responsive device in the form of a neon tube 66 which interconnects gate 53 of the silicon controlled switch and the movable wiper 61 of a potentiometer 62. The resistance element of potentiometer 62, connected in series with a resistor 63, constitutes a voltage divider connected across capacitor 13. A conductor 65 is connected from the upper terminal of the potentiometer resistance element and, by means of conductors 31, 32 and 39, to electrode 52 of the silicon controlled switch. Thus, firing of neon bulb 66 in response to a predetermined voltage at capacitor 13 is effective to connect a negative voltage to the gate electrode and to switch the silicon controlled switch 50 to a high impedance state. Flyback oscillation is immediately interrupted and the oscillator reverts to a class A state of operation wherein the voltages of capacitors 56 and 60 are maintained. The negative voltage applied to the gate of silicon controlled switch 50 through the now conducting neon bulb is effective to maintain the oscillator in class A operation and prevent a return to the relaxation oscillator mode of operation.

Main flash capacitor 13, now charged to the required voltage, will gradually discharge due to current leakage and the like, or due to a sudden discharge of this capacitor through the flash tube 12. When a condition of this nature subsequently occurs, neon tube 66 becomes nonconductive and the negative voltage applied to the gate of the silicon controlled switch is removed to once again allow this switch to be come conductive as a result of the operating voltage established at capacitors 56 and 60 by virtue of the class A mode of operation of the oscillator.

We have found that this arrangement for controlling turn-off and turn-on of the oscillator provides more reliable and predictable operation and contributes appreciably to the efficiency of the unit, conserving the energy available from the low voltage battery.

Since other modifications of our invention will be apparent to those skilled in the art, it is intended that our invention be limited solely by the scope of the appended claims.

We claim as our invention:

1. Electric apparatus, comprising;
a first controllable current conducting device having input means and output means,
transformer means having a plurality of windings,
first circuit means including a source of voltage connected to said first conducting device and adapted to render said first conducting device conductive,
output circuit means interconnecting a winding of said transformer means and the output means of said first conducting device to a source of voltage,
a second controllable current conducting device having input means and output means,
input circuit means interconnecting a winding of said transformer means, the input means of said first conducting device, and the output means of said second conducting device, said input circuit means providing a low level regenerative feedback to cause a first state of oscillation of said first conducting device,
means connected to said transformer means and responsive to said first state of oscillation to provide operating voltage for said second conducting device to render the same conductive and thus alter said input circuit means to provide a high level regenerative feedback to cause a second state of oscillation of said first conducting device,
said second state of oscillation being characterized by the production of oscillations having a waveform which is significantly different from that of the oscillations produced by said first state of oscillation,
electrical energy storage means connected to a winding of said transformer means to accumulate electrical energy which is provided as a result of said second state of oscillation, and means connected to the input of said second conducting device and responsive to the accumulation of a given quantity of electrical energy at said energy storage means to render said second conducting device nonconductive.

2. In a low voltage to high voltage converter of the type having a low voltage battery, a transistor, and transformer means interconnected to form an oscillator with a feedback circuit provided by a secondary winding of the transformer means and with a high voltage provided by a high voltage secondary winding of the transformer means, the improvement comprising;

a control transistor connected in the feedback circuit to provide a high impedance to limit the feedback and cause oscillation at a low state, means responsive to said low state of oscillation to render said control transistor conductive and to thus provide a higher feedback and cause oscillation at a high state, said high state of oscillation being characterized by the production of oscillations having a waveform which is significantly different from that of the oscillations produced by said low state of oscillation, capacitive load means connected to the high voltage secondary winding to be charged thereby, and means connected in controlling relation to said control transistor and connected to be controlled by said capacitive load means to render said control transistor nonconductive upon a given charge existing at said capacitive load means.

3. Electric apparatus for use in converting a low magnitude D.C. voltage to a high magnitude D.C. voltage and to then charge a capacitor, comprising;

an oscillating transistor having its input means and its output means interconnected with the windings of saturable transformer means, with a control transistor, and with a low magnitude D.C. source to cause class A type oscillation when said control transistor is nonconductive and to cause relaxation type oscillation when said control transistor is conductive, means including rectifying means connected to said transformer means and responsive to said oscillation to provide a D.C. operative voltage for said control transistor to render the same conductive, means including rectifying means connected to a high voltage secondary winding of said transformer means to charge the capacitor to a high voltage as a result of said relaxation type oscillation, and voltage responsive means connected to be controlled by the voltage of the capacitor and connected to control said control transistor to render the same nonconductive upon a given voltage appearing at the capacitor to thus terminate the charging of the capacitor.

4. Electric power supply apparatus for use in charging the high voltage capacitor of a photographic flash unit having a low voltage battery, comprising;

a saturable transformer having a primary winding and first and second secondary windings, a transistor having input electrodes and output electrodes, a biasing circuit including current limiting means connected to the input electrodes of said transistor to establish a class A operating point therefor, an output circuit connecting the output electrodes of said transistor in circuit with said transformer primary winding to the low voltage battery, a feedback circuit including voltage polarity responsive variable impedance means connecting the input electrodes of said transistor in circuit with said first transformer secondary winding to provide low magnitude class A oscillation of said transistor when said impedance means is of a high impedance and high magnitude relaxation oscillation of said transistor when said impedance means is of a low impedance, means responsive to said class A oscillation to provide a voltage of a first polarity and connected to said impedance means to control the same to be of said low impedance, rectification circuit means connecting said second transformer secondary winding in circuit with the high voltage capacitor and responsive to said relaxation oscillation to charge the high voltage capacitor, and voltage responsive means connected to be controlled by the high voltage capacitor and connected to control said impedance means to control the same to be of said high impedance when the capacitor is charged to a given voltage.

5. Electric power supply apparatus, comprising;

an oscillating transistor having a pair of input electrodes and a pair of output electrodes, a saturable transformer having a primary winding and a first and second secondary winding, biasing means for said oscillating transistor connected to the input electrodes thereof to establish a class A operating condition for said oscillating transistor, output means including the output electrodes of said oscillating transistor connected in circuit with the primary winding of said transformer, a control transistor having a pair of input electrodes and a pair of output electrodes, impedance means connected to shunt the output electrodes of said control transistor, feedback means including the input electrodes of said oscillating transistor connected in circuit with said first secondary winding and with the output electrodes of said control transistor, said output means and said feedback means establishing an oscillator operating as a class A oscillator when said control transistor is non-conductive and operating as a relaxation oscillator saturating said transformer when said control transistor is conductive, a series circuit including a zener diode and impedance means connected to said primary winding and effective to establish a voltage across said zener diode in response to oscillation of said oscillating transistor, circuit means connecting said zener diode to the input electrodes of said control transistor in a manner to render said control transistor conductive in response to oscillation to thereby establish relaxation oscillation, rectification circuit means connecting a high voltage capacitor to said second secondary winding to charge the same upon the establishment of said relaxation oscillation, a normally non-conductive neon tube, and cutoff circuit means interconnecting said neon tube between the input electrodes of said control transistor and said capacitor, said neon tube being rendered conductive upon the establishment of a predetermined voltage at said capacitor to thereby switch said control transistor to said non-conductive state and reestablish class A oscillation, said neon tube subsequently becoming non-conductive upon a decay in voltage at said capacitor, whereupon said control transistor is again conductive to reinstitute relaxation oscillation and recharging of said capacitor.

6. Electric power supply apparatus, comprising;

an oscillating transistor having a pair of input electrodes and a pair of output electrodes, a saturable transformer having a primary winding and a first and second secondary winding, biasing means for said oscillating transistor connected to the input electrodes thereof to establish a class A operating condition for said oscillating transistor, output means including the output electrodes of said oscillating transistor connected in circuit with the primary winding of said transformer, a control transistor having a pair of input electrodes and a pair of output electrodes, impedance means including rectifying means and capacitance means connected to shunt the output electrodes of said control transistor to apply an operating voltage to the output electrodes of said control transistor, feedback means including the input electrodes of said oscillating transistor connected in circuit with said first secondary winding and with the output electrodes of said control transistor, said output means and said feedback means establishing an oscillator operating as a class A oscillator when said control transistor is non-conductive and operating as a relaxation oscillator saturating said tranformer when said control transistor is conductive, a series circuit including reference voltage device and impedance means connected to said primary winding and effective to establish a voltage across said reference voltage device in response to oscillation of said oscillating transistor, circuit means connecting said reference voltage device to the input electrodes of said control transistor in a manner to render said control transistor conductive in response to oscillation to thereby establish relaxation oscillation, rectification circuit means connecting a high voltage capacitor to said second secondary winding to charge the same upon the establishment of said relaxation oscillation, a normally non-conducting neon tube, and cutoff circuit means interconnecting said neon tube between the input electrodes of said control transistor and said capacitor, said neon tube being rendered conductive upon the establishment of a predetermined voltage at said capacitor to thereby switch said control transistor to said non-conductive state and reestablish class A oscillation, said neon tube subsequently becoming non-condutcive upon a decay in voltage at said capacitor, whereupon said control transistor is again conductive to reinstitute relaxation oscillation and recharging of said capacitor.

7. Electric controlled oscillator apparatus, comprising a first controllable current conducting device having input means and output means, a second controllable current conducting device having a control means and a controlled current conducting path, the impedance of which is controlled by said control means to have a relatively high value when a signal of one polarity is applied to said control means, and to have a relatively low value when a signal of the opposite polarity is applied to said control means, circuit means connecting said controlled path in a regenerative feedback connection between said output means and said input means to cause said apparatus to oscillate in a substantially class A manner when said impedance of said path has said relatively high value, and to oscillate in a substantially relaxation manner when said impedance of said path has said relatively low value, and controlling means connected to said control means to apply at one time a signal of said one polarity to said control means to cause said apparatus to oscillate in said class A manner, and to apply at another time a signal of said opposite polarity to said control means to cause said apparatus to oscillate in said relaxation manner.

8. Apparatus as specified in claim 7, wherein said controlling means derives said signal of said opposite polarity primarily from said class A oscillation of said apparatus, and derives said signal of said one polarity primarily from said relaxation oscillation of said apparatus.

9. Apparatus as specified in claim 7, wherein said second device is a silicon controlled switch having an anode, a cathode, and a cathode gate, wherein said path is the anode-cathode path of said switch, and wherein said control means includes said cathode gate of said switch.

References Cited by the Examiner

UNITED STATES PATENTS

| | | | |
|---|---|---|---|
| 2,774,878 | 12/1956 | Jensen | 331—113.1 |
| 2,813,241 | 11/1957 | Smith et al. | 320—1 |
| 2,849,614 | 7/1958 | Royer et al. | 331—113.1 |
| 2,950,446 | 8/1960 | Humez et al. | 331—113.1 |
| 3,012,181 | 12/1961 | Schultz | 320—1 X |
| 3,127,551 | 3/1964 | Lingle | 320—1 |

BERNARD KONICK, *Primary Examiner.*

IRVING L. SRAGOW, *Examiner.*

G. LIEBERSTEIN, J. BREIMAYER, *Assistant Examiners.*